(12) United States Patent
Meshchaninov et al.

(10) Patent No.: US 11,931,782 B1
(45) Date of Patent: Mar. 19, 2024

(54) IONIC-ELECTRONIC DESTRUCTION DEVICE FOR TREATING WASTE

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 0 days.

(21) Appl. No.: 18/377,856

(22) Filed: Oct. 9, 2023

Related U.S. Application Data

(63) Continuation of application No. PCT/RU2023/000238, filed on Aug. 3, 2023.

(30) Foreign Application Priority Data

Jul. 20, 2023 (RU) ............................ RU2023119250

(51) Int. Cl.
| | |
|---|---|
| *B03C 5/02* | (2006.01) |
| *B03C 7/02* | (2006.01) |
| *B09B 3/50* | (2022.01) |
| *F23G 5/00* | (2006.01) |
| *F23G 5/44* | (2006.01) |

(52) U.S. Cl.
CPC ............. *B09B 3/50* (2022.01); *F23G 5/00* (2013.01); *F23G 5/442* (2013.01); *F23G 2204/201* (2013.01)

(58) Field of Classification Search
CPC .................................. B03C 5/02; B03C 7/02
See application file for complete search history.

(56) References Cited

U.S. PATENT DOCUMENTS

| | | | | |
|---|---|---|---|---|
| 3,970,546 A | * | 7/1976 | Webb ..................... | B03B 9/06 209/31 |
| 6,034,342 A | * | 3/2000 | Schmoutziguer ....... | B03C 7/006 209/127.4 |
| 2017/0008010 A1 | * | 1/2017 | Vizcaino Hernandez .................. | B03C 1/02 |

FOREIGN PATENT DOCUMENTS

| | | |
|---|---|---|
| CN | 0203057022 U | 7/2013 |
| EA | 12275 B1 | 8/2009 |
| RU | 2786209 C1 | 12/2022 |
| RU | 2797526 C1 | 6/2023 |

OTHER PUBLICATIONS

J. Wu et al., Electrostatic Separation for Multi-Size Granule of Crushed Printed Circuit Board Waste Using Two-Roll Separator, 159 J. Hazard. Mater. 230-234 (2008).*
Sinkevich A.A., Dovgalyuk Yu. A., Corona discharge in clouds, News of Higher Schools, Radiophysics, 2013, vol. 56, Issue 11-12, pp. 908-919.
Piskarev I.M., Oxidation-reduction processes in water initiated by electrical discharge above water surface, General Chemistry Journal, 2001, vol. 71, Issue 10, p. 1622.

* cited by examiner

*Primary Examiner* — Randy Boyer
(74) *Attorney, Agent, or Firm* — Bardmesser Law Group

(57) ABSTRACT

The invention relates to devices for disposal of solid and/or liquid waste, in particular, to devices for disposing waste by ionic-electronic destruction method. The invention broadens a range of devices for treating waste, and has an enlarged area of formation of corona discharge streamers, avoiding a need for a source of high-voltage pulses. The technical effect is attained by a device for ionic-electronic destruction of waste. The device includes a waste feed unit, a source of electrically charged substance particles, a suction air fan, an output tube, and a reactor. The reactor is implemented as a closed cavity with an input opening connected to the waste feed unit, with an output opening for removing gaseous destruction products connected to the output tube, and with an additional input opening connected to an outlet of the source of electrically charged substance particles.

20 Claims, 1 Drawing Sheet

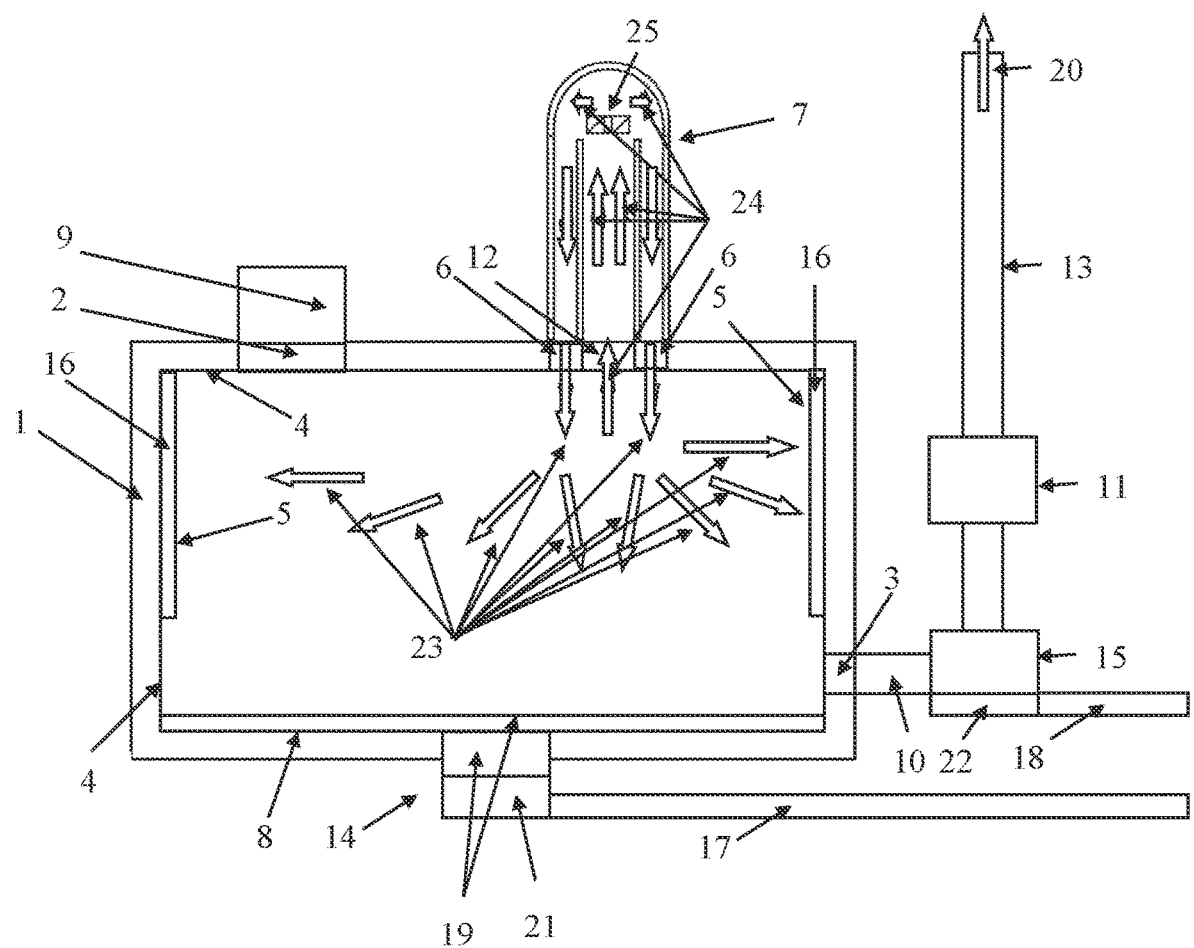

IONIC-ELECTRONIC DESTRUCTION DEVICE FOR TREATING WASTE

BACKGROUND OF THE INVENTION

Field of the Invention

The invention relates to devices for disposal of solid and/or liquid waste, in particular, to devices for disposing waste by ionic-electronic destruction method.

Prior Art

There is a known reactor of patent RU 2786209 (published on Dec. 19, 2022) implemented as a closed cavity having an input opening connected to a waste feed device, and an output opening for removing gaseous destruction products, wherein inner surfaces of the cavity are made entirely or partially conductive. An electrode protrudes into the reactor, and this electrode is isolated from the inner surfaces. The electrode is connected to a source of high-voltage pulses. A size of a gap between the electrode and the conductive surfaces of the cavity provides formation of corona discharge streamers.

Drawbacks of this reactor are small size of area around the electrode, where the corona discharge streamers are formed, which impedes treating waste located away from the electrode, and necessity of using the source of high-voltage pulses for the reactor operations.

SUMMARY OF THE INVENTION

The invention is directed to broadening a range of devices for treatment of waste, and to having enlarged area of formation of corona discharge streamers, and to avoiding use of a source of high-voltage pulses, where possible.

The technical effect is attained by a device for ionic-electronic destruction of waste. The device includes a waste feed unit, a source of electrically charged substance particles, a suction air fan, an output tube, and a reactor. The reactor is implemented as a closed cavity with an input opening connected to the waste feed unit, an output opening for removing gaseous destruction products connected to the output tube, and an additional input opening connected to outlet of the source of electrically charged substance particles.

Preferably, the reactor is implemented with an additional output opening connected to inlet of the source of electrically charged substance particles. Preferably, the source of charged substance particles is implemented as a triboelectric effect (i.e., where electric charges transfer between two objects when they contact or slide against each other) source. In one embodiment, the output tube is equipped with an expansion tank intended for cooling and condensing vaporized and gaseous destruction products leaving the reactor.

In one embodiment, the output tube is equipped with an electrostatic filter. In one embodiment, inner surfaces of the reactor cavity are made conductive entirely or partially. In one embodiment, inner surface of the reactor cavity has a cooling circuit intended for condensing vaporized and gaseous destruction products leaving the reactor. In one embodiment, the cooling circuit of the inner surface of the reactor cavity is water-based.

Preferably, the cooling circuit of the inner surface of the reactor cavity is implemented with a metal surface facing inside the reactor. Preferably, conductive portions of the inner surfaces of the reactor cavity are made of steel or another metal.

In one embodiment, non-conductive inner surfaces of the reactor cavity have a protective dielectric coating. In one embodiment, bottom of the reactor cavity is flat and conductive. In one embodiment, the bottom of the reactor cavity is covered with water or a conductive water-containing liquid. In one embodiment, the bottom of the reactor cavity includes a bath or several baths for collecting condensed destruction products. In one embodiment, the bath(s) in the bottom of the reactor cavity is (are) filled with water or a water-containing liquid.

Preferably, intake of air into the reactor is restricted. In one embodiment, restriction of ingress of air is provided by means of a tamping plug that closes input of the reactor, where the tamping plug is pre-formed by compressing waste prior to loading thereof into the reactor. In one embodiment, reduced pressure inside the reactor is provided by connecting an electrostatic filter with the suction air fan to the output opening.

Preferably, pressure inside the reactor is reduced by 0.1 to 1.0 Pa relative to atmospheric pressure. Preferably, the device for ionic-electronic destruction of waste is implemented with a pipeline for removal of the condensed destruction products the bath(s) in the bottom of the reactor cavity. Preferably, the device for ionic-electronic destruction of waste is implemented with a pipeline for removal of the condensed destruction products from the expansion tank.

Additional features and advantages of the claimed solution are described in the following disclosure, as well as proved by the actual practice of the invention. These advantages and improvements can be achieved by neural networks that have been constructed and trained in accordance with the claimed method, specifically, following the disclosure, along with the accompanying claims and drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a vertical cross-section of a device for ionic-electronic destruction of waste.

DETAILED DESCRIPTION OF EMBODIMENTS OF THE INVENTION

Reference will now be made in detail to the preferred embodiments of the present invention, examples of which are illustrated in the accompanying drawings.

The invention is illustrated in FIG. 1, which shows a vertical cross-section of a device for ionic-electronic destruction of waste, wherein the following designators are used:

1 body of reactor with inner cavity
2 input opening of reactor
3 output opening of reactor
4 inner surface of reactor cavity
5 conductive surface of water cooling circuit
6 additional input opening
7 triboelectric source of electrically charged substance particles 8 bottom of reactor
9 unit for feeding waste to be treated
10 electrostatic filter
11 suction air fan
12 additional output opening for feeding discharged particles from reactor to source (7) of electrically charged substance particles (e.g., dust)
13 output tube
14 bath in bottom of reactor
15 expansion tank
16 water cooling circuit
17 pipeline for removal of condensed destruction products from bath in bottom of reactor
18 pipeline for removal of condensed destruction products from expansion tank
19 water
20 gaseous products of destruction of waste
21 destruction products condensed in reactor
22 destruction products condensed in expansion tank
23 airflows with charged substance particles
24 airflows with non-charged substance particles
25 suction air fan of triboelectric source of charged substance particles With reference again to FIG. 1, the invention may be implemented as a device for ionic-electronic destruction of waste. The reactor body (1) of the device has the input opening (2) connected to a feed unit (9) for feeding solid and/or liquid waste to be treated, and the output opening (3) for removal of gaseous destruction products from the reactor. The feed unit (9) is configured to restrict ingress of air into the reactor. The output opening (3) is connected to input of the electrostatic filter (10). Output of the electrostatic filter (10) is connected to an expansion tank (15). The expansion tank (15) is connected to the suction air fan (11) that draws gaseous destruction products (20) to the output tube (13) connected thereto.

Outlet of the triboelectric source (7) of charged substance particles is connected to the additional input opening (6) of the cavity of the reactor body (1), and inlet of the triboelectric source (7) of charged substance particles is connected to the additional output opening (12) of the cavity of the reactor body (1). Surfaces (5) of water cooling circuit (16) for condensing destruction products are made of steel. The bottom (8) of the reactor includes the bath (14) and is covered with water (19). The pipeline (17) is intended for removal of condensed destruction products (21) from the bath (14) in the bottom (8) of the reactor, and the pipeline (18) is intended for removal of condensed destruction products (22) from the expansion tank (15).

The device operates as follows. A portion of compressed waste, e.g., solid household waste is loaded into the device from the unit (9) for feeding waste to be treated via the input opening (2), while ingress of atmospheric air into the reactor body (1) is restricted. Charged substance particles are supplied from the source (7) of charged substance particles into a cavity of the reactor body (1) via the additional input opening (6).

As is known from [1], charged particles start causing corona discharge streamers, which start multiplying and spreading away from the particles, gradually filling the whole volume of the cavity of the reactor body (1). Electrons of the corona discharge streamers exert an effect on water contained in the loaded waste and cause formation of free radicals upon destruction of water molecules: $H_2O \rightarrow OH\bullet + H\bullet$. In addition, other active substances are formed in the reactor due to corona discharge streamers: $O_3$, $O_2(a^1\Delta)$, $H_2O_2$, $O(^3P)$, NO, $HNO_2$ and $HNO_3$. Corona discharge also causes ultraviolet (UV) radiation. The above-mentioned active substances and UV radiation destroy any organic and inorganic substances contained in waste to be treated, thus providing destruction thereof and formation of harmless gaseous reaction products, namely, water and carbon dioxide. Non-organic contents of waste are destroyed by acids $HNO_2$ and $HNO_3$, which are formed in the reactor due to corona discharge. The process of oxidation of organic substances in water is a chain reaction [2]. Low-rate chain reaction may be initiated by atmospheric oxygen and ozone. High-rate chain reaction is initiated by OH radicals. In other words, ionic-electronic destruction of both organic and inorganic substances contained in waste is provided in the device.

Vapors of various destruction products (21) are condensed on the metal surfaces (5) of the water cooling circuit (16), where temperature of water is kept lower that temperature inside the reactor. The condensed destruction products (21) run down the surfaces (5) to the bottom of the bath (14) in the reactor, and then drain through the pipeline (17). Vaporized and gaseous destruction products enter the output opening (3) of the reactor and, after refining by the electrostatic filter (10), they are supplied to the expansion tank (15), where cooling and condensing vapors of various destruction products occur during adiabatic expansion thereof. Condensed destruction products are collected on the bottom of the expansion tank (15) and further they drain through the pipeline (18).

Substance particles are discharged, e.g., due to interaction among themselves or with the steel surfaces (5) of the water cooling circuit (16), and simultaneously they are drawn by the suction air fan (25) into the additional output opening (12) for supplying the particles discharged during destruction initiation processes to the source (7) of electrically charged substance particles for their charging again. After that, the charged again particles re-enter the cavity of the reactor body (1) via the additional input opening (6) and form streamers. The destruction process is repeated until total destruction of waste loaded into the device is completed.

Thus, the specified technical effect is attained in the claimed device, i.e., ionic-electronic destruction of both organic and inorganic substances contained in household waste is provided.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

NON-PATENT LITERATURE (INCORPORATED HEREIN BY REFERENCE IN THEIR ENTIRETY)

[1] Sinkevich A. A., Dovgalyuk Yu. A., *Corona discharge in clouds*, News of Higher Schools, Radiophysics, 2013, Vol. 56, Issue 11-12, pages 908-919.
[2] Piskarev I. M., *Oxidation-reduction processes in water initiated by electrical discharge above water surface*, General Chemistry Journal, 2001, Vol. 71, Issue 10, page 1622.

What is claimed is:
1. A device for ionic-electronic destruction of waste, comprising:
  a waste feed unit;

an output tube;
a suction air fan mounted on the output tube;
a reactor in a form of a closed cavity having an input opening connected to the waste feed unit, and having an output opening connected to the output tube for removing gaseous destruction products,
a source of electrically charged particles; and
an additional input opening connected to the source of electrically charged particles, such that corona discharge streamers form inside the reactor when the electrically charged particles are supplied to the reactor through the additional input opening.

2. The device of claim 1, wherein the source of electrically charged particles is a triboelectric source.

3. The device of claim 1, wherein the output tube is connected to an expansion tank for cooling and condensing vaporized and gaseous destruction products leaving the reactor.

4. The device of claim 3, further comprising a pipeline for removal of condensed destruction products from the expansion tank.

5. The device of claim 1, wherein the output tube includes an electrostatic filter.

6. The device of claim 1, wherein inner surfaces of the closed cavity are entirely or partially conductive.

7. The device of claim 6, wherein conductive portions of the inner surfaces of the reactor cavity are made of steel or another metal.

8. The device of claim 6, wherein non-conductive inner surfaces of the reactor cavity have a protective dielectric coating.

9. The device of claim 1, wherein an inner surface of the closed cavity includes a cooling circuit for condensing vaporized and gaseous destruction products.

10. The device of claim 9, wherein the cooling circuit of the inner surface of the reactor cavity is water-based.

11. The device of claim 9, wherein the cooling circuit of the inner surface of the reactor cavity has a metal surface facing into the reactor.

12. The device of claim 1, wherein a bottom of the reactor cavity is flat and conductive.

13. The device of claim 1, wherein a bottom of the reactor cavity is covered with water or a conductive water-containing liquid.

14. The device of claim 1, wherein a bottom of the reactor cavity includes a bath for collecting condensed destruction products.

15. The device of claim 14, wherein the bath in the bottom of the reactor cavity is filled with water or with a conductive water-containing liquid.

16. The device of claim 14, further comprising a pipeline for removal of condensed destruction products from the bath.

17. The device of claim 1, wherein ingress of air into the reactor is restricted.

18. The device of claim 17, wherein restriction of ingress of air into the reactor is provided by a tamping plug that closes input of the reactor, and the tamping plug is preformed by compressing waste prior to loading the waste into the reactor.

19. The device of claim 1, wherein pressure inside the reactor is reduced by 0.1 to 1.0 Pa relative to atmospheric pressure.

20. The device of claim 19, wherein the reduced pressure inside the reactor is provided by connecting an electrostatic filter with the suction air fan to the output opening.

* * * * *